United States Patent
Eaton (10) Patent No.: US 7,593,194 B2
(45) Date of Patent: Sep. 22, 2009

(54) TAPE RECORDING HEAD PROMOTING LATERAL MOTION

(75) Inventor: James Howard Eaton, Morgan Hill, CA (US); Glynda Williams Eaton, legal representative, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 10/999,387

(22) Filed: Nov. 30, 2004

(65) Prior Publication Data

US 2006/0114609 A1    Jun. 1, 2006

(51) Int. Cl.
G11B 5/33 (2006.01)
G11B 5/127 (2006.01)

(52) U.S. Cl. .................. 360/316; 360/314; 360/315

(58) Field of Classification Search ............ 360/129, 360/314, 315, 316, 264.2, 266.3
See application file for complete search history.

(56) References Cited

U.S. PATENT DOCUMENTS

| | | |
|---|---|---|
| 3,633,189 A | 1/1972 | Billawala |
| 4,599,666 A * | 7/1986 | Liu et al. ............. 360/267 |
| 4,789,914 A | 12/1988 | Ainslie et al. |
| 5,810,094 A | 9/1998 | Kesler et al. |
| 5,859,749 A | 1/1999 | Zarouri et al. |
| 6,188,546 B1 | 2/2001 | Nakajima et al. |
| 6,271,995 B1 | 8/2001 | Fontana, Jr. et al. |
| 6,318,624 B1 | 11/2001 | Pattanaik et al. |
| 6,355,122 B1 | 3/2002 | Itoh et al. |
| 6,424,499 B1 | 7/2002 | Balakrishnan et al. |
| 6,522,499 B1 * | 2/2003 | Takayama et al. ........... 360/129 |
| 6,543,677 B2 | 4/2003 | Pattanaik et al. |
| 6,563,675 B1 | 5/2003 | Shinjo et al. |
| 6,611,398 B1 * | 8/2003 | Rumpler et al. ............. 360/129 |
| 2001/0039716 A1 | 11/2001 | Palmer et al. |
| 2003/0002217 A1 | 1/2003 | Ohinata |

OTHER PUBLICATIONS

W.L. Wright, "Magnetic Head Arm Assembly", IBM Technical Disclosure Bulletin, vol. 23, No. 12, May 1981, pp. 5556-5557.

* cited by examiner

*Primary Examiner*—Andrea L Wellington
*Assistant Examiner*—Adam B Dravininkas
(74) *Attorney, Agent, or Firm*—Gibb I.P. Law Firm, LLC; Daniel E. Johnson, Esq.

(57) ABSTRACT

A multi-channel tape recording head or apparatus that has cable connection pads aligned along a direction that runs substantially perpendicular to a multi-channel tape recording head actuation direction, which allows a ribbon-type external cable, connected to the cable connection pads, to bend in its most flexible direction when the multi-channel tape recording head moves.

40 Claims, 8 Drawing Sheets

TAPE RECORDING HEAD PROMOTING LATERAL MOTION

BACKGROUND OF THE INVENTION

1. Field of the Invention

Disclosed is a tape recording head/apparatus where cable connection pads run substantially perpendicular to the direction in which the head moves, which causes the ribbon-type external cable to be bent in its most flexible direction when the head module actuates.

2. Description of the Related Art

In a conventional multi-channel tape recording head, the cables are attached to the head chip in the same plane the recording elements are fabricated. Since a typical multi-channel tape recording head requires 50 or more interconnections in order to connect all of the recording elements, the cables are wide and stiff in the plane of the recording elements. In order to keep the recording elements centered on the data tracks on the tape, a voice coil actuator typically moves the head laterally across the tape, which is in the cable 'stiff' direction. To allow for the lateral motion of the head, cables must be either very long or must be rotated so that the motion is accommodated in the 'easy' direction of bending. The typical rotation takes up considerable space and adds mass that the actuator must move.

SUMMARY OF THE INVENTION

Disclosed is a tape recording head/apparatus that has an actuator operatively connected to a head module, wherein the actuator is adapted to move the head module in a head actuation direction. Transducers are positioned on the head module substantially parallel to the head actuation direction. Wiring within the head module has first ends connected to the transducers and second ends connected to cable connection pads on the head module. The cable connection pads are aligned along a direction that is substantially perpendicular to the head actuation direction. A ribbon-type external cable is connected to the cable connection pads.

The transducers are aligned in a substantially straight first line, and the cable connection pads are aligned in a substantially straight second line. The first line is substantially parallel to the head actuation direction and the second line is substantially perpendicular to the head actuation direction.

The head module can include an air bearing surface adjacent the transducers. The wiring runs along at least two different substantially perpendicular surfaces of the head module. The cable has different bending stiffness coefficients in different directions, and the bending stiffness coefficient of the cable is the lowest in a direction substantially perpendicular to the head actuation direction.

In another embodiment, a back closure is connected to the head module. The back closure has back closure wiring connected to head module wiring. Also, the back closure has cable connection pads connected to the back closure wiring, which are again positioned substantially perpendicular to the head actuation direction.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Figure 1:
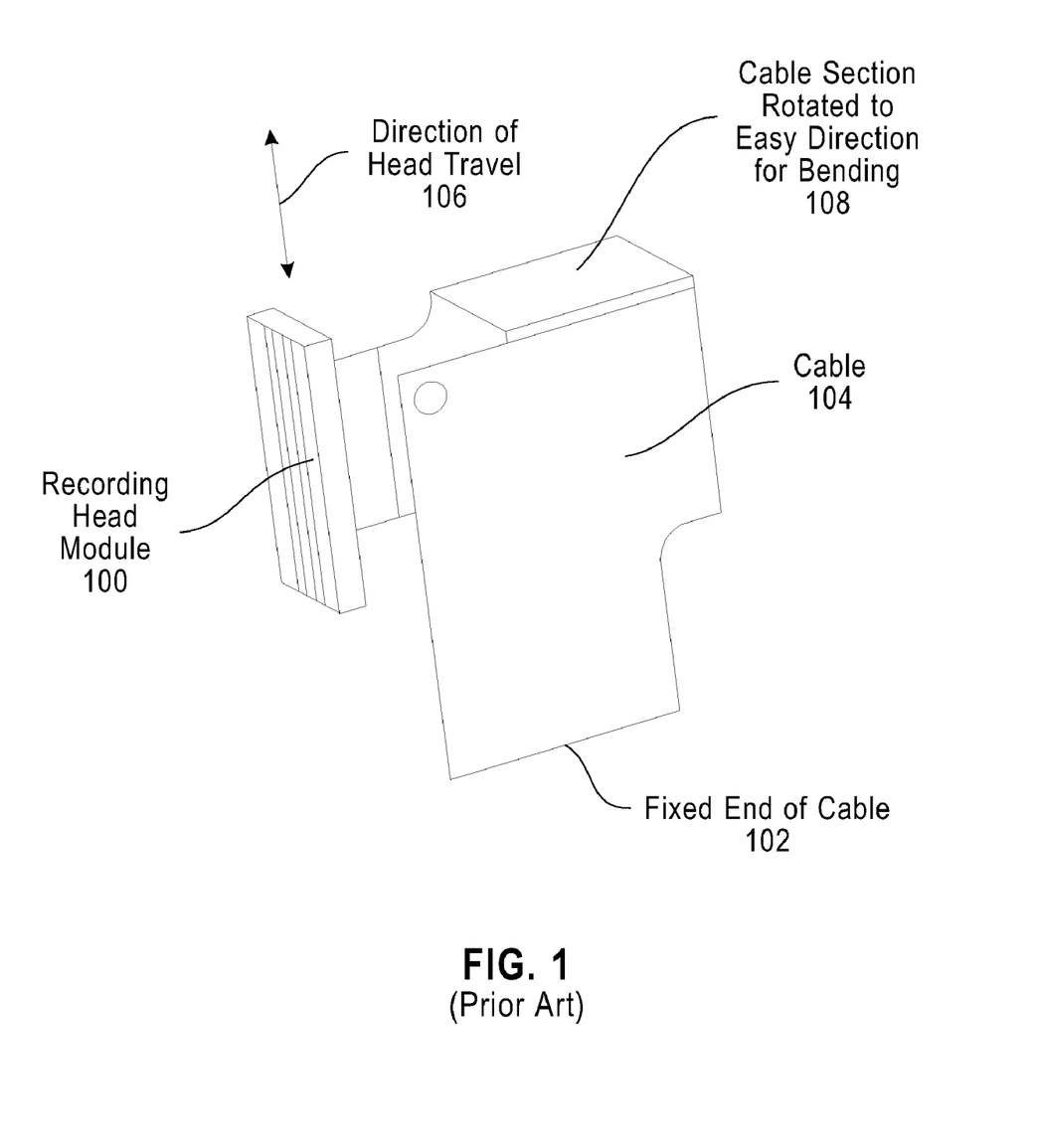
FIG. 1 is a schematic diagram of a cable and a recording head.

FIG. 1 shows a ribbon-like cable 104 connected to a multi-channel recording head 100. Item 102 represents the fixed end of the cable. Where the ribbon-like cable 104 is connected to the recording head module 100, the flat portion of the ribbon-like cable is parallel to the direction of head travel (head actuation direction) 106. Therefore, the cable is rotated in the area 108 to accommodate the head's motion 106 and to allow the cable 104 to flex in the direction in which the ribbon-like cable 104 most easily bends. In FIG. 1, item 108 represents the cable section that is rotated to the easy direction for bending the cable.

Figure 2:
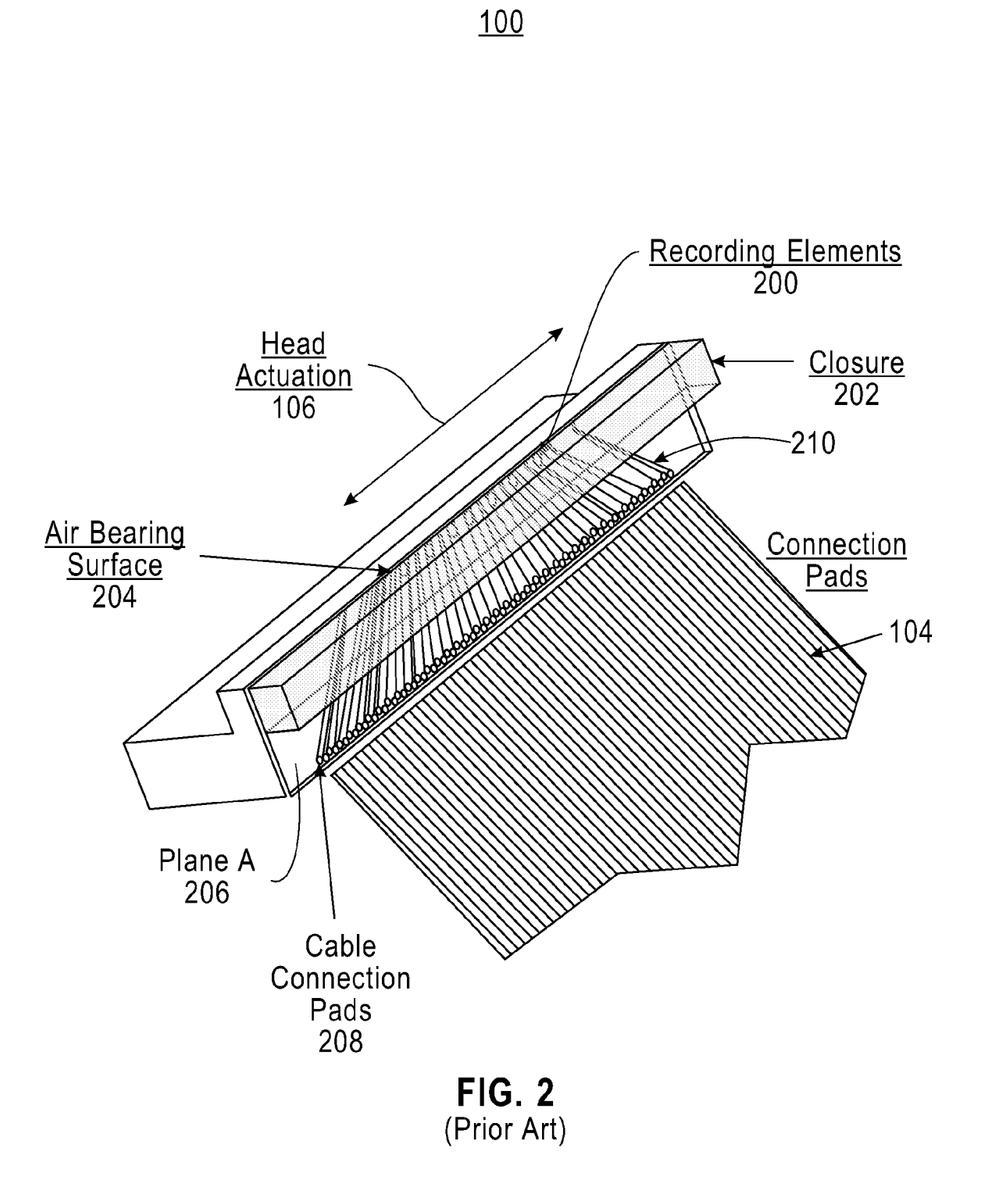
FIG. 2 is a schematic diagram of the recording head shown in FIG. 1.

FIG. 2 shows a more detailed diagram of the recording head module 100 shown in FIG. 1. Recording elements 200 such as inductive transducers, etc. are positioned along one edge of the recording head 100 that is along the air bearing surface 204. A closure 202 is positioned adjacent to the edge along which the recording elements 200 are positioned. Wires 210 run between the recording elements 200 and the cable connection pads 208. The ribbon-like cable 104 is shown as being connected to the cable connection pads 208 in FIG. 2. The manufacturing methods and materials to be used in producing this type of structure are well-known and are described in, for example, U.S. Pat. No. 6,271,995 which is incorporated herein by reference.

As shown in FIG. 2, in this structure, the cable connection pads 208 are on plane A (206). Therefore, the line of cable connection pads is substantially parallel to the head actuation direction 106. When the recording head 100 moves in the head actuation direction 106, it moves in a direction perpendicular to the natural bending direction of the ribbon-like cable 104. Therefore, as shown in FIG. 1, the cable 104 must be rotated at area 108 (shown in FIG. 1) to allow the ribbon-like cable 104 to bend in the direction it most easily bends, when the head articulates in direction 106.

Figure 3:
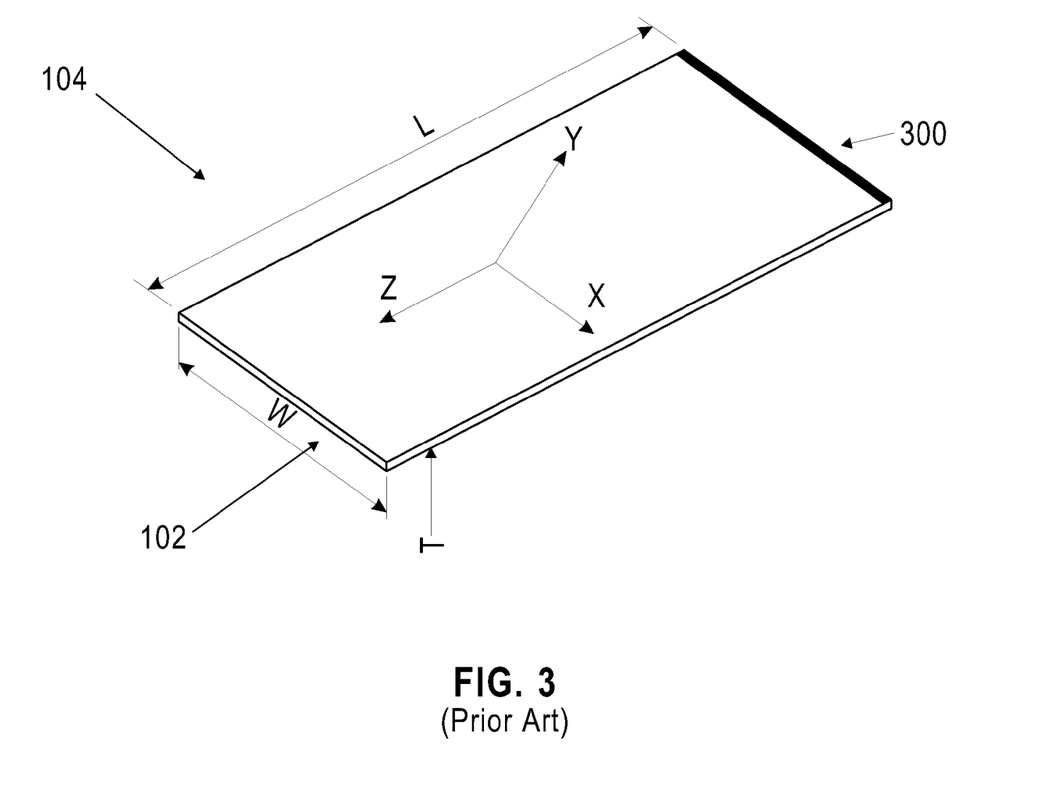
FIG. 3 is a schematic diagram of the cable shown in FIG. 1.

The motion 106 of the head 100 shown in FIG. 1 is the "X" direction in FIG. 3, which is a difficult direction for the ribbon-like cable 104 to bend. As mentioned above, because the cable 104 is ribbon-like, it bends most easily in one direction and it is very difficult to bend the cable 104 in any perpendicular direction. FIG. 3 shows a schematic of a cable with thickness T, width W and length L. FIG. 3 also illustrates cable connectors 300 that will connect to the cable connection pads 208. The stiffness of the cable (S) in a given direction can be calculated once the width (W), length (L), and thickness (T) are known, using the following equalities (where K represents a constant for the material used for the cable). For the stiffness in the Y direction (which is perpendicular to the cable), $S_Y = KTW^3$, while for the stiffness in the X direction, $S_X = KWT^3$, thus, ratio of cable bending (which is perpendicular to the cable) stiffness (see FIG. 3) between the hard and easy directions is $S_X/S_Y = (T/W)^2$. For typical ribbon-like cables used in tape drives, this ratio can be more than 3000.

Figure 4A:
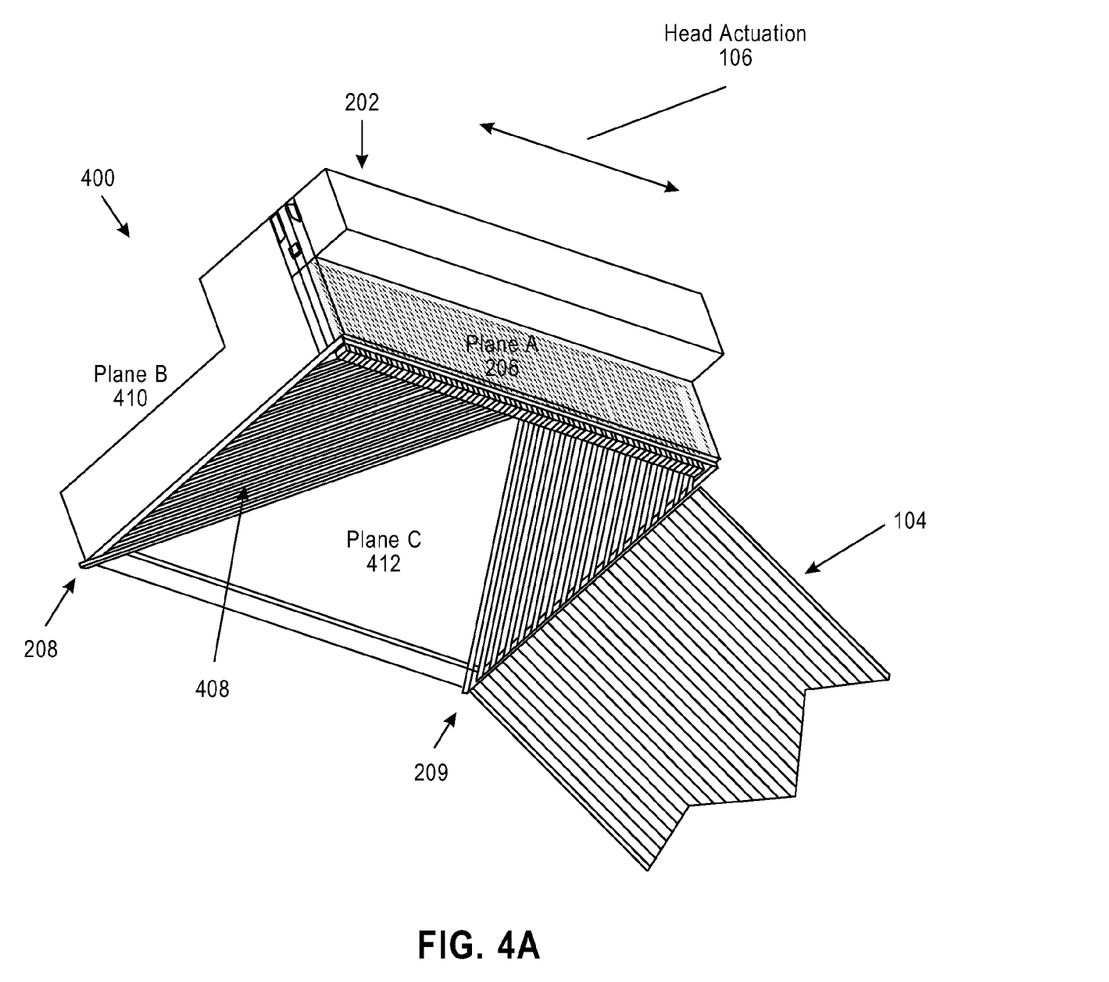
FIGS. 4A and 4B are schematic diagrams of another recording head.
Figure 4B:
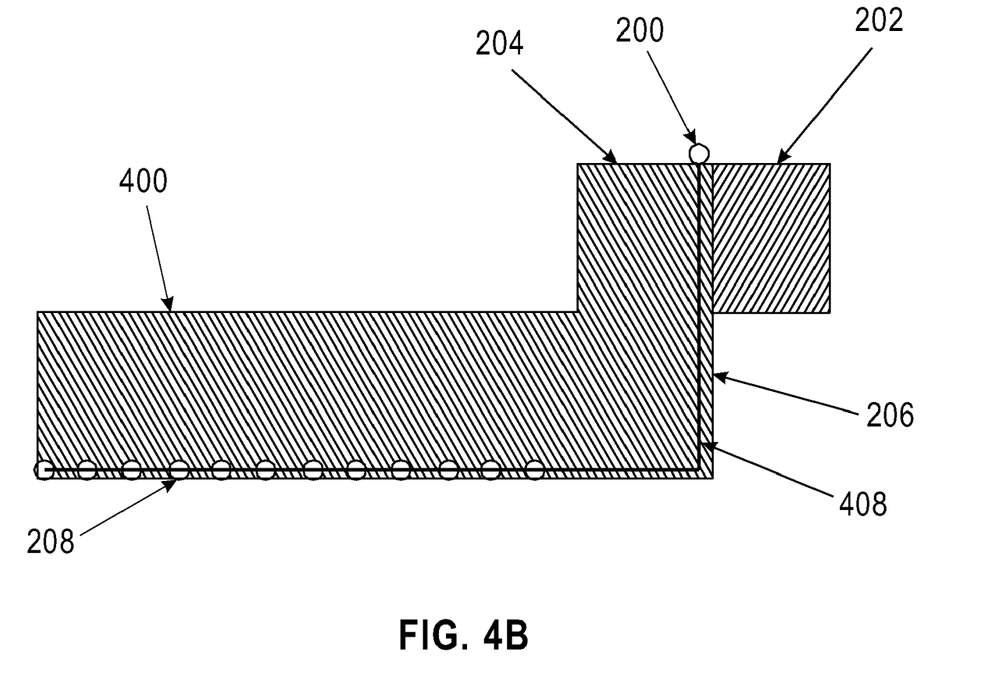

In order to overcome this problem, the structure shown in FIGS. 4A and 4B positions the cable connection pads 208 in a line perpendicular to the articulation motion 106 of the head module. More specifically, FIGS. 4A and 4B illustrate a tape recording head/apparatus 400 that has an L-shaped head module with an attached closure 202. FIG. 4A is a perspective drawing, while FIG. 4B illustrates the same structure from a side-view. As with the previous structures, this L-shaped structure is formed using well-known processing steps.

In a similar manner to the structure shown in FIG. 2, the recording elements (transducers) 200 are positioned on the head module 400. Wiring 408 within or on the head module has first ends connected to the transducers (at the end of plane A 206) and second ends connected to cable connection pads 208. The cable connection pads 208 are positioned along one or more second edges of the first longer portion 402 of the head module 400. Again, the methods and materials used to form these types of structures (but not the specific shapes and positions described herein) are well-known to those ordinarily skilled in the art, and a detailed discussion in the same is avoided herein.

The cable connection pads 208 run along a line substantially perpendicular to the head actuation direction 106. This allows the flat portion of the cable 104 to be positioned substantially perpendicular to the head actuation motion 106. Thus, the ribbon-like cable 104 is urged to bend in the direction it most easily bends when the head assembly 400 moves in the head actuation direction 106.

The transducers 200 are aligned in a substantially straight line that is parallel to the head actuation direction 106, and the cable connection pads 208 are also aligned in a substantially straight line, but one that is perpendicular to the head actuation direction 106. Additionally, as with the structure shown in FIG. 2, an air bearing surface 204 is positioned adjacent to the transducers 200.

The wiring 408 runs along at least two different substantially perpendicular surfaces (plane A 206 and plane C 412) of the head module 400. The wiring 408 can be continued onto plane B 410 for ease of cable attachment and additional wiring fan out. In addition, the wiring 408 and cable connection pads 208 can be located such that the cable connection pads 208, 209 are positioned along the two edges of plane C 412, as shown in FIG. 4A. In FIG. 4A, two separate cables 104 (or two portions of the same cable 104) could be connected to the two different sets of cable connection pads 208; however, the second cable is not illustrated in the drawing so as to not obscure the remaining features. Alternatively, the wiring 408 and cable connection pads 208 can be located such that the cable connection pads 208 are positioned along only one edge of plane C 412.

Figure 5:
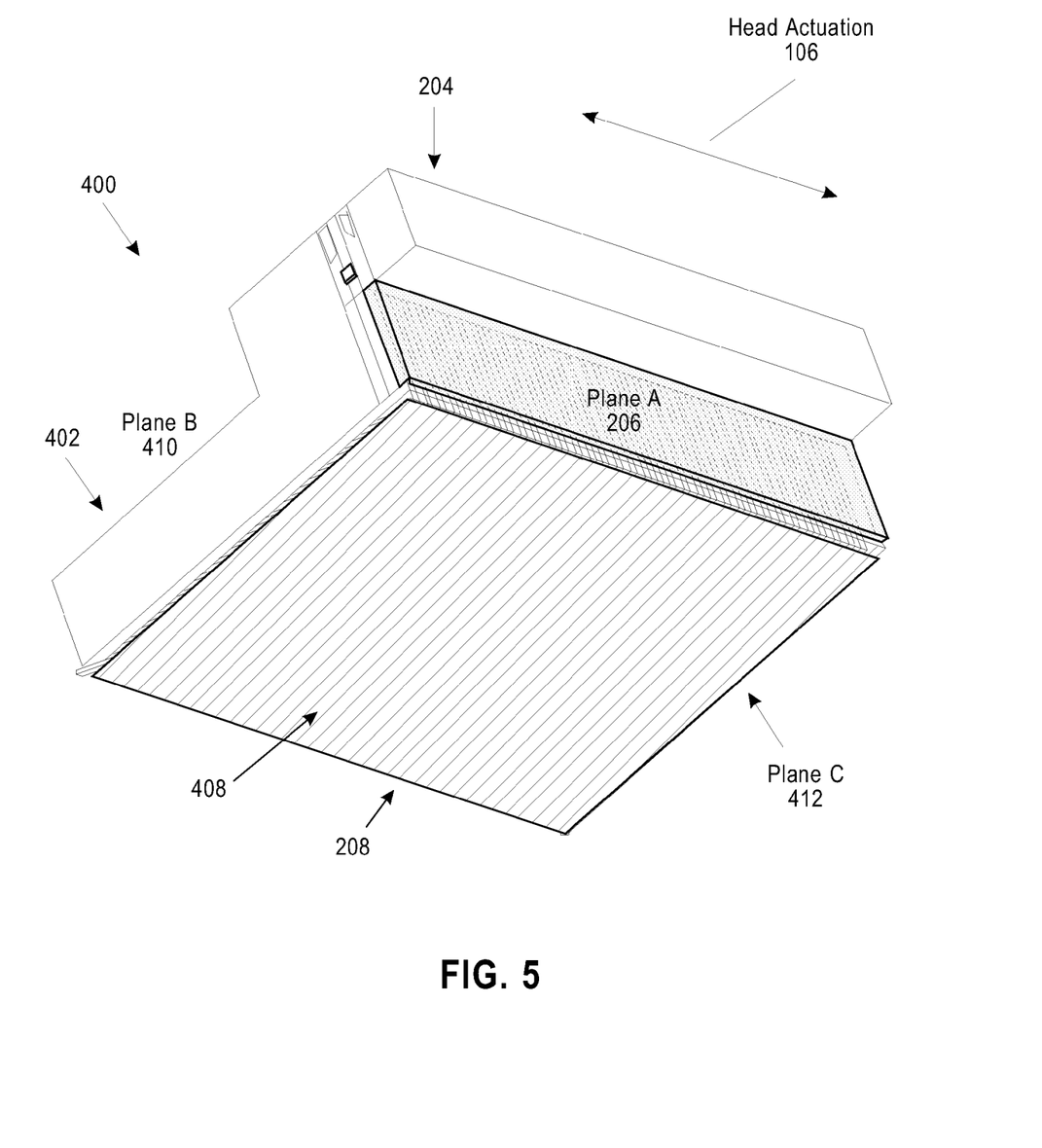
FIG. 5 is a schematic diagram of yet another recording head.
Figure 6:
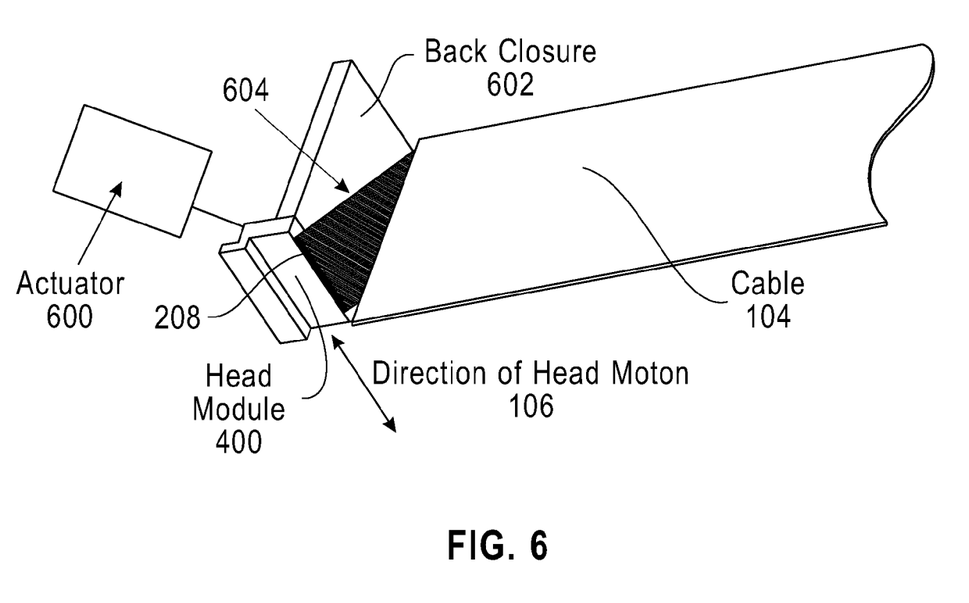
FIG. 6 is a schematic diagram of a cable and the recording head shown in FIG. 5.

FIGS. 5 and 6 illustrate another embodiment where the wiring 408 is directed straight along plane C 412, and not at an angle as shown in FIG. 4A. Thus, the wiring 408 extends straight from plane A 206 to the edge of plane C that is directly opposite the edge that connects to plane A 206, as shown in FIG. 5. As shown in FIG. 6, these cable connection pads connect to wiring 604 on a back closure 602. The diagonal wiring 604 is connected to the cable 104. Because the wiring 604 crosses the back closure 602 at an angle, the cable 104 is again connected to the head assembly 400 such that the cable is substantially perpendicular to the direction of the head motion 106. FIG. 6 also includes a schematic box drawing of an actuator 600 connected to the head module. The actuator 600 shown in FIG. 6 is, therefore, operatively connected to the head module 400 through various structures such as arms, supports, etc. and is adapted to move the head module 400 in direction 106 which causes the ribbon-type external cable 104 to be bent in its most flexible direction. As would be understood by one ordinarily skilled in the art, many different types of actuators and many different types of connections can be utilized with the invention and such actuators are well-known to those ordinarily skilled in the art, and details thereof are not included herein.

Figure 7:
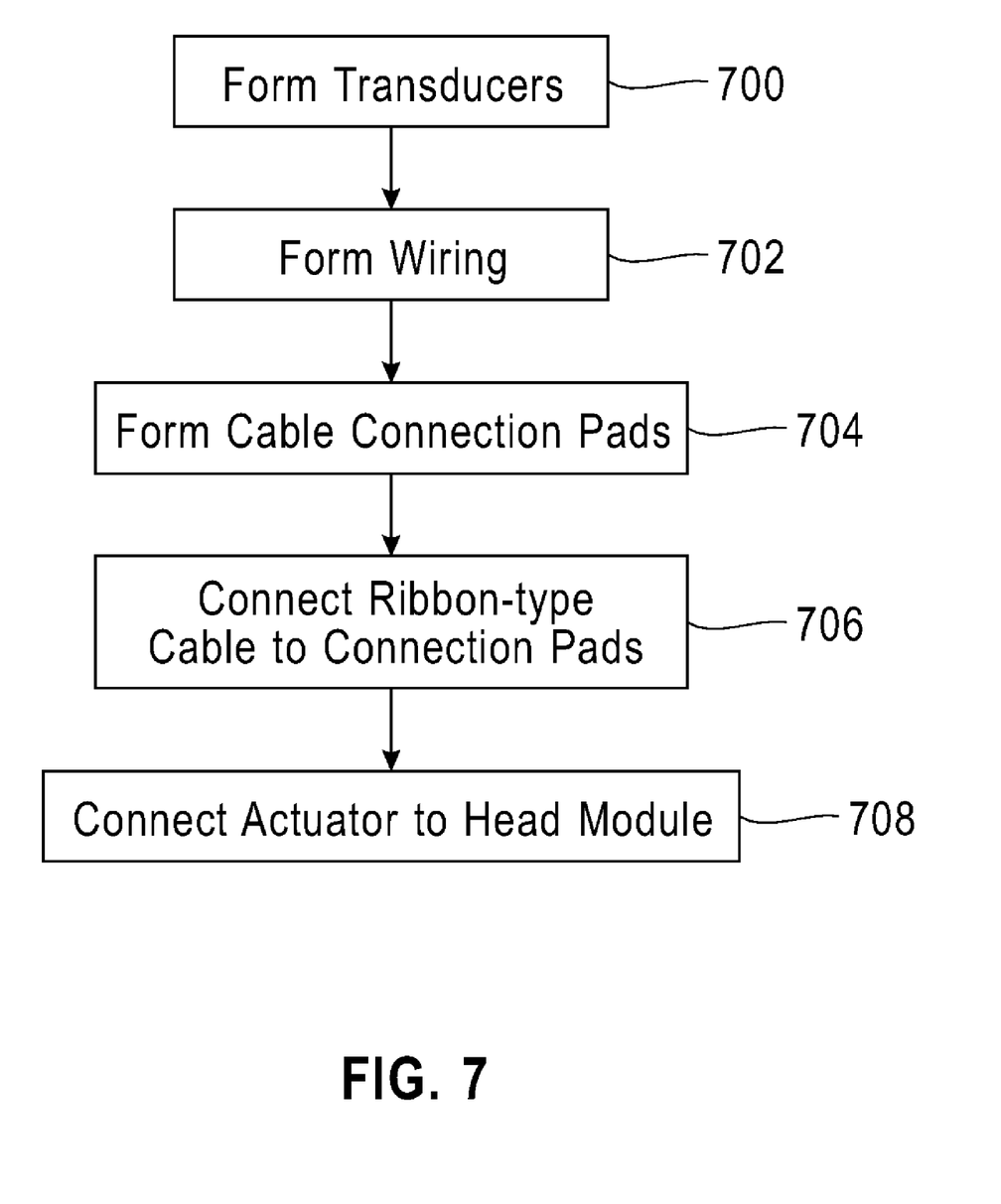
FIG. 7 is a flow diagram illustrating one embodiment of the invention.

FIG. 7 illustrates one preferred method of forming the inventive tape recording head in flowchart form. Transducers are formed on the head module substantially parallel to the head actuation direction in item 700. Wiring is formed within the head module in item 702. The wiring has first ends connected to the transducers and second ends. In item 704, cable connection pads are formed on the head module such that the cable connection pads are connected to the second ends of the wiring. This process of forming the cable connection pads positions the cable connection pads substantially perpendicular to the head actuation direction. In item 706, the ribbon-type external cable is connected to the cable connection pads. This method operatively connects the actuator to the head module in item 708. Again, the actuator is adapted to move the head module in a head actuation direction.

The process of forming the transducers in item 700 aligns the transducers in a substantially straight first line, and the process of forming the cable connection pads in item 704 aligns the cable connection pads in a substantially straight second line. The first line is substantially parallel to the head actuation direction and the second line is substantially perpendicular to the head actuation direction.

In item 700, an air bearing surface can be provided on the head module adjacent the transducers. The process of forming the wiring in item 702 forms the wiring to run along at least two different substantially perpendicular surfaces of the head module. The cable that is attached in item 706 has different bending stiffness coefficients in different directions, and the bending stiffness coefficient of the cable is the lowest in a direction substantially perpendicular to the head actuation direction.

In the second embodiment shown in FIGS. 5 and 6, the processes of forming the wiring in item 702 and forming cable connection pads in item 704 includes connecting the back closure to the head module. Again, the back closure has back closure wiring connected to second ends of the head module wiring. This embodiment forms cable connection pads on the back closure 602 such that the cable connection pads are connected to said back closure wiring. Again, this process of forming the cable connection pads positions the cable connection pads along a line substantially perpendicular to the head actuation direction.

As mentioned above, the ribbon-type external cable 104 that is connected to the cable connection pads has different bending stiffness coefficients in different directions. The bending stiffness coefficient of the cable is the lowest in a direction substantially perpendicular to the direction in which the head module articulates (106) and is therefore most flexible in a direction in which the head module articulates. Since the cable connection pads 208 are located on the sides of the recording head 400, the cable 104 may be attached after the module is completed. This permits module building and alignment to be done at the rowbar level, producing more modules with one alignment and attachment to a beam.

As shown above, the invention provides a tape recording head/apparatus where the cable connection pads run substantially perpendicular to the head actuation direction, which causes the ribbon-type external cable to be bent in its most flexible direction when the head module moves. Thus, the inventive structure reduces both the stiffness and the mass that the actuator must accommodate.

While the invention has been described in terms of preferred embodiments, those skilled in the art will recognize that the invention can be practiced with modification within the spirit and scope of the appended claims.

What is claimed is:

1. A tape recording head comprising:
   a head module adapted to move in a head actuation direction;
   transducers positioned on said head module that are aligned along a direction substantially parallel to said head actuation direction;
   wiring having first ends and second ends, wherein said first ends are connected to said transducers;
   cable connection pads on said head module connected to said second ends of said wiring; and
   a ribbon-type external cable connected to said cable connection pads;
     wherein said cable connection pads are aligned along a direction substantially perpendicular to said head actuation direction; and
     wherein said ribbon-type external cable connected to said cable connection pads has different bending stiffness coefficients in different directions, and wherein the bending stiffness coefficient of said cable is the lowest in a direction substantially perpendicular to said head actuation direction to allow bending upon head actuation.

2. The tape recording head according to claim 1, wherein said transducers are aligned in a substantially straight first line, and wherein said cable connection pads are aligned in a substantially straight second line.

3. The tape recording head according to claim 2, wherein said first line is substantially parallel to said head actuation direction and said second line is substantially perpendicular to said head actuation direction.

4. The tape recording head according to claim 1, further comprising an air bearing surface on said head module adjacent said transducers.

5. The tape recording head according to claim 1, wherein said wiring runs along at least two different substantially perpendicular surfaces of said head module.

6. The tape recording head according to claim 1, wherein an actuator operatively connected to said head module is adapted to move said head module in said head actuation direction.

7. A tape recording head comprising:
   a head module adapted to move in a head actuation direction;
   transducers on said head module that are aligned along a direction that is substantially parallel to said head actuation direction;
   head module wiring having first ends and second ends, wherein said first ends are connected to said transducers;
   a back closure connected to said head module, said back closure having back closure wiring connected to said second ends of said head module wiring;
   cable connection pads on said back closure connected to said back closure wiring; and
   a ribbon-type external cable connected to said cable connection pads;
     wherein said cable connection pads are aligned along a direction that is substantially perpendicular to said head actuation direction; and
     wherein said ribbon-type external cable connected to said cable connection pads has different bending stiffness coefficients in different directions, and wherein the bending stiffness coefficient of said cable is the lowest in a direction substantially perpendicular to said head actuation direction to allow bending upon head actuation.

8. The tape recording head according to claim 7, wherein said transducers are aligned in a substantially straight first line, and wherein said cable connection pads are aligned in a substantially straight second line.

9. The tape recording head according to claim 8, wherein said first line is substantially parallel to said head actuation direction and said second line is substantially perpendicular to said head actuation direction.

10. The tape recording head according to claim 7, further comprising an air bearing surface on said head module adjacent said transducers.

11. The tape recording head according to claim 7, wherein said wiring runs along at least two different substantially perpendicular surfaces of said head module.

12. The tape recording head according to claim 7, wherein an actuator operatively connected to said head module is adapted to move said head module in said head actuation direction.

13. A tape recording apparatus comprising:
   a head module;
   an actuator operatively connected to said head module, wherein said actuator is adapted to move said head module in a head actuation direction;
   transducers on said head module that are aligned along a direction that is substantially parallel to said head actuation direction;
   wiring having first ends and second ends, wherein said first ends are connected to said transducers;
   cable connection pads on said head module connected to said second ends of said wiring, wherein said cable connection pads are aligned along a direction that is substantially perpendicular to said head actuation direction; and
   a ribbon-type external cable connected to said cable connection pads,
     wherein said ribbon-type external cable has different bending stiffness coefficients in different directions, and wherein the bending stiffness coefficient of said cable is the lowest in a direction substantially perpendicular to said head actuation direction to allow bending upon head actuation.

14. The tape recording apparatus according to claim 13, wherein said transducers are aligned in a substantially straight first line, and wherein said cable connection pads are aligned in a substantially straight second line.

15. The tape recording apparatus according to claim 14, wherein said first line is substantially parallel to said head actuation direction and said second line is substantially perpendicular to said head actuation direction.

16. The tape recording apparatus according to claim 13, further comprising an air bearing surface on said head module adjacent said transducers.

17. The tape recording apparatus according to claim 13, wherein said wiring runs along at least two different substantially perpendicular surfaces of said head module.

18. A method of forming a tape recording head, said method comprising:
   providing a head module designed to be moved in a head actuation direction;
   forming transducers on said head module that are aligned along a direction substantially parallel to said head actuation direction;
   forming wiring having first ends and second ends;
   connecting said first ends to said transducers; and
   forming cable connection pads on said head module such that said cable connection pads are connected to said second ends of said wiring;
   connecting a ribbon-type external cable to said cable connection pads;
      wherein said ribbon-type external cable has different bending stiffness coefficients in different directions; and
      wherein the bending stiffness coefficient of said ribbon-type external cable is the lowest in a direction substantially perpendicular to said head actuation direction to allow bending upon head actuation; and
      wherein said process of forming said cable connection pads positions said cable connection pads along a direction substantially perpendicular to said head actuation direction.

19. The method according to claim 18, wherein said process of forming said transducers aligns said transducers in a substantially straight first line, and wherein said process of forming said cable connection pads aligns said cable connection pads in a substantially straight second line.

20. The method according to claim 19, wherein said first line is substantially parallel to said head actuation direction and said second line is substantially perpendicular to said head actuation direction.

21. The method according to claim 18, wherein said providing said head module comprises providing an air bearing surface on said head module adjacent said transducers.

22. The method according to claim 18, wherein said forming wiring includes running wiring along at least two different substantially perpendicular surfaces of said head module.

23. The method according to claim 18, further comprising operatively connecting an actuator to said head module, wherein said actuator is adapted to move said head module in said head actuation direction.

24. A method of forming a tape recording head, said method comprising:
   providing a head module designed to be moved in a head actuation direction;
   forming transducers on said head module that are aligned along a direction that is substantially parallel to said head actuation direction;
   forming head module wiring having first ends and second ends;
   connecting said first ends to said transducers;
   connecting a back closure to said head module, wherein said back closure has back closure wiring connected to said second ends of said head module wiring; and
   forming cable connection pads on said back closure such that said cable connection pads are connected to said back closure wiring;
   connecting a ribbon-type external cable to said cable connection pads, wherein said ribbon-type external cable has different bending stiffness coefficients in different directions;
      wherein the bending stiffness coefficient of said ribbon-type external cable is the lowest in a direction substantially perpendicular to said head actuation direction; and
      wherein said process of forming said cable connection pads positions said cable connection pads along a direction substantially perpendicular to said head actuation direction to allow bending upon head actuation.

25. The method according to claim 24, wherein said process of forming said transducers aligns said transducers in a substantially straight first line, and wherein said process of forming said cable connection pads aligns said cable connection pads in a substantially straight second line.

26. The method according to claim 25, wherein said first line is substantially parallel to said head actuation direction and said second line is substantially perpendicular to said head actuation direction.

27. The method according to claim 24, wherein said providing said head module comprises providing an air bearing surface on said head module adjacent said transducers.

28. The method according to claim 24, wherein said forming wiring includes running wiring along at least two different substantially perpendicular surfaces of said head module.

29. The method according to claim 24, further comprising operatively connecting an actuator to said head module, wherein said actuator is adapted to move said head module in said head actuation direction.

30. A method of forming a tape recording head, said method comprising:
   providing a head module to be operatively connected to an actuator, wherein said actuator is adapted to move said head module in a head actuation direction;
   forming transducers on said head module along a direction that is substantially parallel to said head actuation direction;
   forming wiring having first ends and second ends;
   connecting said first ends to said transducers; and
   forming cable connection pads on said head module such that said cable connection pads are connected to said second ends of said wiring;
      wherein said process of forming said cable connection pads positions said cable connection pads along a direction that is substantially perpendicular to said head actuation direction; and
   connecting a ribbon-type external cable to said cable connection pads;
      wherein said ribbon-type external cable has different bending stiffness coefficients in different directions, and wherein the bending stiffness coefficient of said ribbon-type external cable is the lowest in a direction substantially perpendicular to said head actuation direction to allow bending upon head actuation.

31. The method according to claim 30, wherein said process of forming said transducers aligns said transducers in a substantially straight first line, and wherein said process of forming said cable connection pads aligns said cable connection pads in a substantially straight second line.

32. The method according to claim 31, wherein said first line is substantially parallel to said head actuation direction and said second line is substantially perpendicular to said head actuation direction.

33. The method according to claim 30, wherein said providing said head module comprises providing an air bearing surface on said head module adjacent said transducers.

34. The method according to claim 30, wherein forming wiring includes running wiring along at least two different substantially perpendicular surfaces of said head module.

35. A method of forming a tape recording head, said method comprising:
- providing a head module designed to be moved in a head actuation direction;
- forming transducers on said head module that are aligned along a direction that is substantially parallel to said head actuation direction;
- forming wiring having first ends and second ends;
- connecting the first ends to said transducers;
- forming cable connection pads on said head module such that said cable connection pads are connected to said second ends of said wiring, and
- connecting a ribbon-type external cable to said cable connection pads, wherein said ribbon-type external cable has different bending stiffness coefficients in different directions;
  - wherein said forming of said ribbon-type external cable connection pads includes positioning said pads along a direction selected to relieve tension in said ribbon-type external cable when said head module moves in said head actuation direction, by urging said ribbon-type external cable to bend in a direction other than a direction associated with the greatest stiffness coefficient; and
  - wherein the bending stiffness coefficient of said ribbon-type external cable is the lowest in a direction substantially perpendicular to said head actuation direction to allow bending upon head actuation.

36. The method according to claim 35, wherein said process of forming said transducers aligns said transducers in a substantially straight first line, and wherein said process of forming said cable connection pads aligns said cable connection pads in a substantially straight second line.

37. The method according to claim 36, wherein said first line is substantially parallel to said head actuation direction and said second line is substantially perpendicular to said head actuation direction.

38. The method according to claim 35, wherein said providing said head module comprises providing an air bearing surface on said head module adjacent said transducers.

39. The method according to claim 35, wherein said forming wiring includes running wiring along at least two different substantially perpendicular surfaces of said head module.

40. The method according to claim 35, further comprising operatively connecting an actuator to said head module, wherein said actuator is adapted to move said head module in said head actuation direction.

\* \* \* \* \*

UNITED STATES PATENT AND TRADEMARK OFFICE
CERTIFICATE OF CORRECTION

PATENT NO. : 7,593,194 B2  Page 1 of 1
APPLICATION NO. : 10/999387
DATED : September 22, 2009
INVENTOR(S) : James Howard Eaton, deceased It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1179 days.

Signed and Sealed this

Twenty-first Day of September, 2010

David J. Kappos
*Director of the United States Patent and Trademark Office*